June 11, 1935.  E. G. HEDMAN  2,004,096
WEIGHING SCALE
Filed Nov. 12, 1931  3 Sheets-Sheet 1

Inventor,
Erik Gustaf Hedman,
by Walter P. Geyer
Attorney.

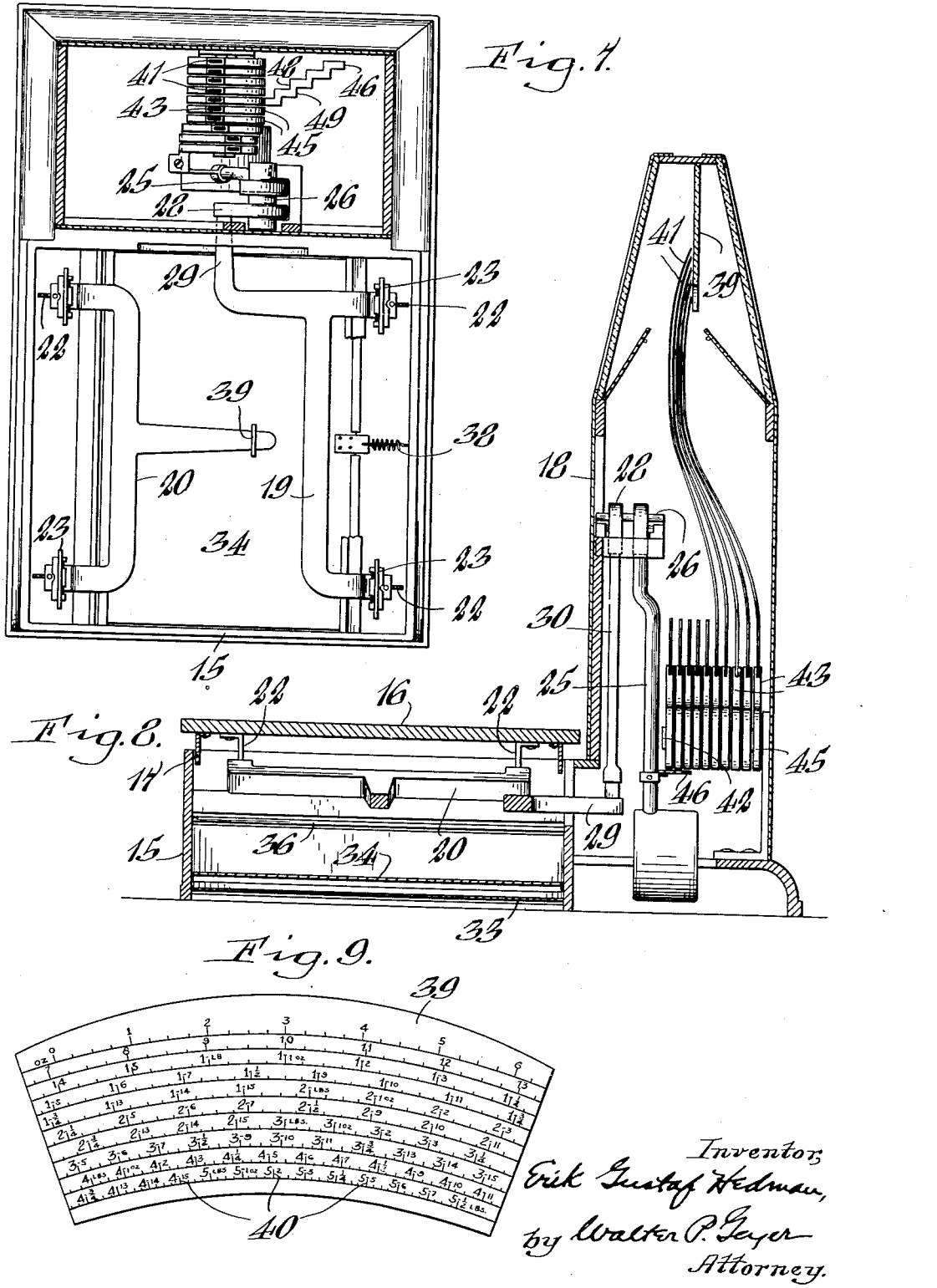

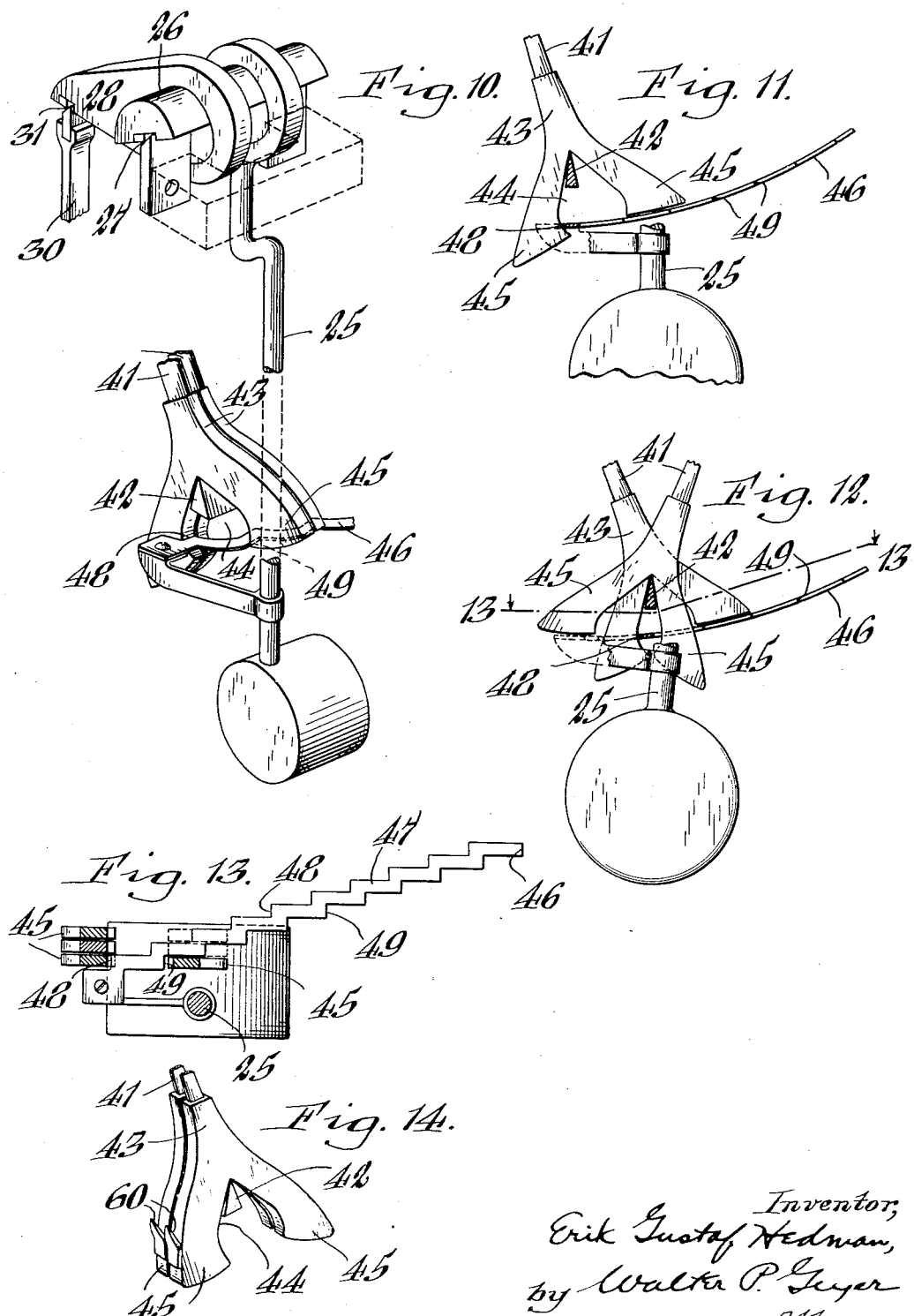

Patented June 11, 1935

2,004,096

UNITED STATES PATENT OFFICE 2,004,096

WEIGHING SCALE

Erik Gustaf Hedman, Buffalo, N. Y.

Application November 12, 1931, Serial No. 574,573

23 Claims. (Cl. 265—62)

This invention relates to new and useful improvements in an automatic weighing scale.

One of its objects is the provision of a scale of this character which is simple, compact, strong and sensitive in construction, which is accurate for both minimum and maximum weights, which is springless and free from other appurtenances which create friction and otherwise interfere with the accurate performance of the scale.

Another object of the invention is to provide the scale with sensitive knife edge pivots and complementary bearings which are simple and inexpensive, which are effectively held against lateral displacement and yet held in proper alinement, and which are so arranged that they are practically dust and dirt proof and make for accuracy in the scale readings.

A further object is to construct and arrange the platform mechanism of the scale that the levers, pivots, etc., are completely covered and protected by the platform itself against dust, dirt and moisture, and further, to so arrange the lever mechanism that it serves as a counterpoise for the platform.

A still further object of the invention is to provide a clear reading scale having mechanical magnifying means which afford a maximum scale reading area in a minimum space.

In the accompanying drawings:—

Figure 1:
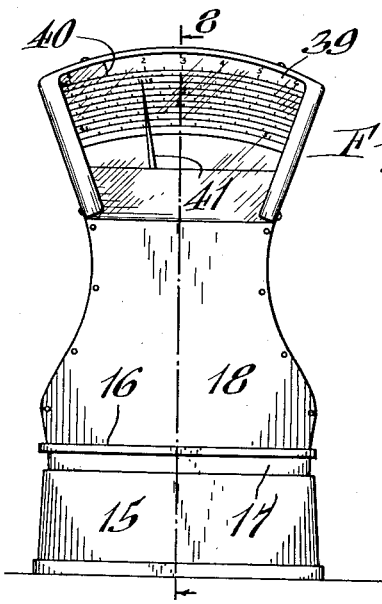
Figure 2:
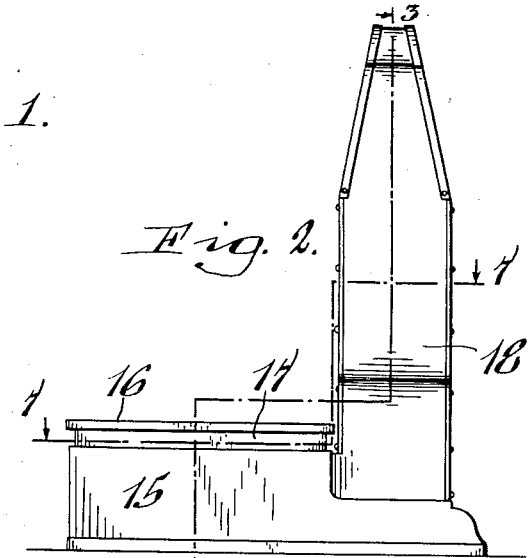
Figure 3:
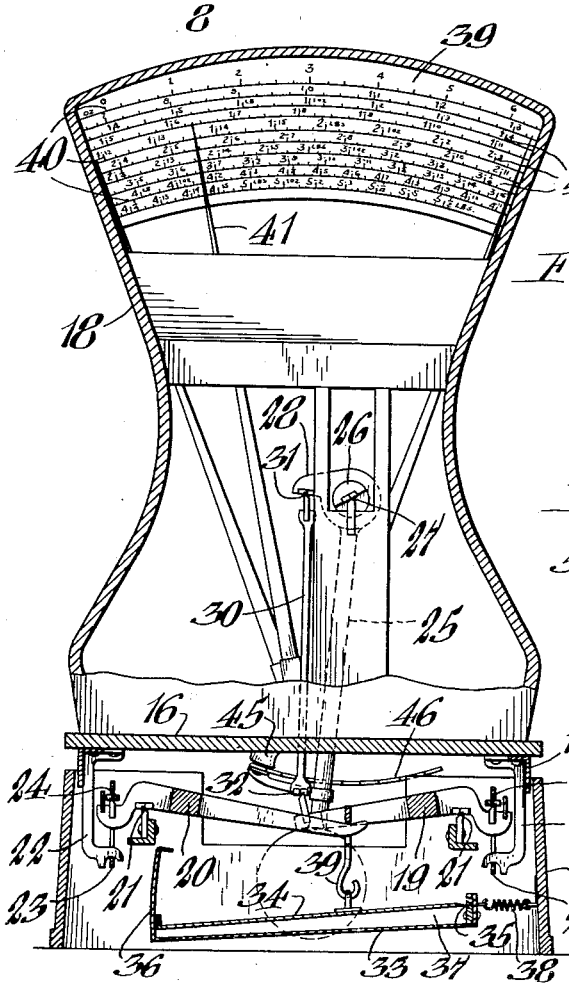
Figure 4:
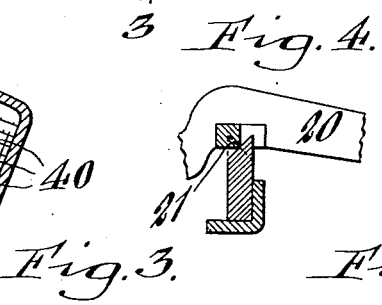
Figure 5:
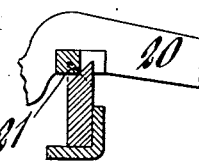
Figure 6:
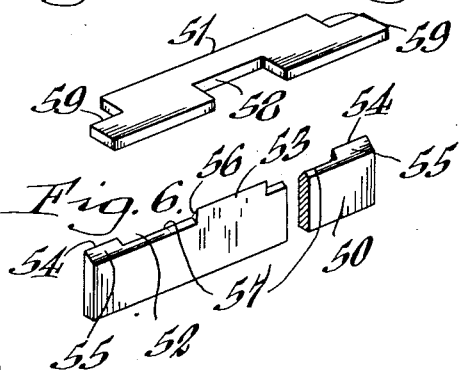

Figure 1 is a front elevation of a scale embodying my invention. Figure 2 is a side elevation thereof. Figure 3 is an enlarged transverse section taken substantially in the plane of line 3—3 Figure 2. Figure 4 is a cross section showing in detail one of the knife edge pivots of the scale. Figures 5 and 6 are perspective views of one of the bearings and knife edge pivots, respectively. Figure 7 is an enlarged horizontal section on line 7—7, Figure 2. Figure 8 is an enlarged vertical section taken on line 8—8, Figure 1. Figure 9 is an enlarged detached face view of the weight-indicating scale or panel. Figure 10 is a perspective view of the weighted pendulum and associated parts, showing the disposition of the indicating hands or pointers for effecting the magnified scale-reading. Figures 11 and 12 are detail front views showing the means for actuating the indicating hands or pointers. Figure 13 is a horizontal section taken in the plane of line 13—13, Figure 12. Figure 14 is a perspective view of the lower or fulcrum ends of adjoining pointers.

Similar characters of reference indicate corresponding parts throughout the several views.

By way of example, my improved automatic weighing scale has been illustrated in connection with a counter type of scale comprising a base 15 preferably of hollow rectangular form and constituting a casing or support for the leverage mechanism of the scale, a platform 16 for receiving the material to be weighed and supported in a superposed position relative to the base and having a depending marginal rim or flange 17 to form a dust seal between the platform and the interior of the base, and a substantially fan shaped casing 18 rising from the rear end of the base and containing the indicating mechanism of the scale.

The leverage mechanism which is governed by the platform 16 and in turn actuates the indicating mechanism of the scale preferably consists of horizontally-opposed vertically-swinging levers 19 and 20 housed within the base 15 and fulcrumed intermediate their ends upon corresponding knife-edge pivots 21. Depending from the opposite sides of the platform 16 beyond the fulcrum points 21 are brackets 22 connected by pull-links 23 with the outer arms of the companion levers 19, 20 through the medium of overhanging fulcrum points 24, as clearly shown in Figure 3. The numeral 25 indicates the load-balancing member or pendulum which is disposed within the indicator-casing 18 and which is provided at its upper end with a bearing member or rock shaft 26 including a knife-edge pivot 27 for permitting free swinging movement of the pendulum in response to the movements of the platform 16. Radiating from the bearing member 26 is a crank arm 28 and interposed between the latter and a laterally projecting arm 29 on the lever 19 is a compression link 30 connected at its ends to such parts by knife-edge pivots 31 and 32, respectively.

Associated with the leverage mechanism is a pneumatic cushioning device for absorbing any shocks, oscillations or undue vibrations escaping from the leverage and indicating mechanism incidental to the application and removal of the load to and from the scale-platform 16. While this cushioning device can be of any suitable and appropriate construction, it preferably consists of an air pump including a box-like structure having a fixed bottom wall 33 disposed within the lower portion of the base 15 and suitably secured thereto, and a top wall 34 hinged at 35 on a knife-edge pivot for movement toward and from the companion fixed wall 33. The free edge of the movable wall 34 travels along the end wall 36 of the box-structure, the several walls defining an air chamber 37 which constitute an air cushion. A spring 38 applied to the pivoted edge of the movable wall 34 constantly urges the same toward the knife-edge pivot and there is sufficient clearance between the side and free edges of the wall 34 and the adjoining walls to permit of the proper movement thereof. The movable wall 34 is connected by a hook 39 with the free end of the lever 20, so as to be raised and lowered thereby.

By this construction, the operating parts of the scale are free to function without undue vibration being transmitted to the platform 16 and indicating mechanism of the scale, hereinafter to be described, with the result that such parts are brought to a comparatively abrupt stop and objectionable oscillations are avoided. During the movement of the pneumatic cushioning element, the air is free to escape slowly from the chamber 37 between the marginal edges of the movable wall 34 and the adjoining walls of the base 15 and the wall 36. By mounting the leverage mechanism in the manner shown and described, and making the joint between the base and the platform comparatively dust-tight, the fulcrum points of the leverage mechanism are protected against dust and other foreign matter, the platform 16 constituting a closure for the base and accomplishing this end. Furthermore, by disposing the levers 19 and 20 in opposing relation transversely of the base, they serve as counter weights for the platform and associated parts, which makes for a lighter, more compact, and stronger construction, and eliminates the necessity of additional counter-poise.

The indicating mechanism of my weighing apparatus is so designed as to produce what might be termed a mechanical magnified reading of the weights imposed upon the scale, and to this end the mechanism is preferably constructed as follows:

The numeral 39 indicates a weight-indicating panel or dial disposed at the upper end of the casing 18 and having a plurality of rows of graduations 40 thereon and disposed one below the other in an arcuate fashion. In Figure 9 I have shown an enlarged face view of this indicating dial which, by way of example, is graduated into ounces and pounds, the first or top row of graduations spanning a weight of six ounces and the remaining rows being graduated proportionately up to a reading of five and one-half pounds. By graduating the dial in this manner, it is possible to obtain a magnified reading of the weighted material imposed upon the scale. Associated with the weight indicating panel, to successively traverse in proper sequence the respective rows of weight-graduations 40, are a plurality of swinging indicators or pointers 41 corresponding in number to such rows and preferably disposed side by side within the casing 18 and each fulcrumed upon a common knife-edge pivot 42 suitably supported near the lower end of said casing, as seen in Figure 8. These pointers are successively actuated in response to the movement of the load platform 16 preferably through the medium of the load-balancing pendulum 25, so that when the pendulum is moved in one direction, as when a load is placed upon the platform, those pointers within the weight-range of the material placed on the machine are moved successively across the weight-indicating dial until the proper pointer is reached which registers the weight of the material placed upon the scale. The previously shifted pointers remain in their automatically projected position where they are not seen, that is, beyond the usual sight glass, while the other pointers, if there be any, remain in their initial positions at the left hand side of the scale where they are also hidden from view. To accomplish these results, each of the pointers 41 is provided at its lower or fulcrum end with an actuating head or yoke 43 having a substantially inverted V-shaped bearing notch 44 in its lower edge which rests upon the knife-edge pivot 42, in the manner shown in Figures 10, 11 and 12, this notch providing outwardly-diverging depending arms or tappets 45 at opposite sides of the pointer-fulcrum. The knife-pivot 42 is disposed centrally beneath the graduation dial 39 and in the extreme left hand and right hand positions of each pointer, their arms 45 are such as to overbalance the weight of the pointer and hold them in such extreme positions at the opposite ends of the dial.

The means for successively actuating these pointers, in response to the movements of the platform and the corresponding movements of the pendulum 25, consists of a trip element or bar 46 preferably applied to the lower end of the pendulum and below the fulcrum 42 of the pointers, so that at predetermined times this trip element will encounter the respective pointer-heads and selectively and automatically shift the pointers forwardly to an indicating position over the graduation dial or backwardly to their initial or normal position. This trip element is preferably concentric with the axis of the pendulum fulcrum and is shaped to provide a plurality of step-like portions 47 which extend transversely beneath the pointer-heads in the manner shown in Figures 10 and 13, each one of these step-like portions being companion to one of the pointers and located in the plane thereof. Each of these step-like portions includes oppositely-facing shoulders or abutments 48 and 49, respectively, which are adapted to engage the opposing inner edges of the head-tappets 45, so that when the pendulum is swung in one direction the stepped abutment 48 will encounter the left hand tappet of the companion pointer 41 and shift the latter forwardly across the dial, while on the return movement of the pendulum the companion stepped abutment 49 encounters the right hand tappet of such pointer-head to automatically return the pointer to its initial position. During this action the tappets 45 are alternately rocked below the plane of movement of the trip bar 46, one being in the path of travel of the bar and the other clear thereof, as seen in Figure 12, and for this purpose the mouth of the head-notch 44 is substantially equal in width to that of the stepped portions 47 of said bar, and the opposing edges of the notch adjoining this mouth are preferably curved outwardly and inwardly to provide a wiping contact between the head-tappets and the trip bar, as the pointer is shifted in one direction or the other. It will be understood from the foregoing, that as the stepped portions 47 of the trip element 46 are caused by the movement of the pendulum to move into vertical alinement with the pointer-fulcrum 42, that they will successively actuate their companion pointers, and upon return of the pendulum to its initial position the previously actuated pointers will be successively returned, but in the reverse order, to their initial positions.

The various fulcrum or pivot points hereinbefore referred to, such as the pivots 21, 24, 27, 31 and 32 are all of the same general construction, and are preferably constructed as follows, it being understood that the description of one will suffice for all:

The fulcrum is in the form of a knife-edge pivot consisting of two bars 50 and 51 made from substantially flat stock and disposed or mounted at substantially right angles to each other in simulation of the letter T, the bar 50 constituting the upright or relatively fixed pivot member and the bar 51 constituting the rocking or movable bearing member which is disposed over the adjoining edge of the companion bar. These bars 50, 51 are secured in any suitable manner to the support and pivoted element, such as the lever 20, respectively, and are interconnected with one another to permit a free rocking action of the latter relative to the former about a line or knife-edge contact and they are at the same time held against relative displacement both lengthwise and crosswise of the bars. To this end, the pivot bar 50 is provided in its top edge with a plurality of notches 52 which form resulting upstanding tongues 53 and 54. In the example shown in the drawings, particularly in Figures 4, 5 and 6, the bar 50 is provided with the substantially central tongue 53 and the end tongues 54, the latter being provided with beveled bearing faces 55 inclined in one direction and the intermediate tongue 53 having a beveled face 56 inclined in the opposite direction. The bottom edges 57 of the notches 52 are knife-like or V-shape and are formed by continuing the beveled faces 55 and 56 coextensively across the bottoms of the notches, as seen in Figures 4 and 6. The rock bar 51 is provided in one of its longitudinal edges with a central, laterally-facing notch 58 and in its opposite edge with end notches 59 which are adapted to register with the corresponding tongues 53 and 54 of the pivot bar 50. The bottom edges of the notches 58 and 59 are in approximately longitudinal alinement and are located midway between or centrally of its bar. In the assembled position of the knife-edge pivot members, the bar 51 overlies the companion bar 50 and the bottom face of the former contacts with the knife-edges 57 of the bar-notches 52, and the bottom corner-edges of the bar notches 58 and 59 have alined contact with the corresponding beveled faces 56 and 54, respectively, of the bar 50, whereby a continuous line or knife-edge fulcrum is provided between the bars. By this construction, a frictionless and sensitive pivot is provided wherein the companion elements are reliably held by the intermeshing and tongues against relative endwise displacement, and are effectively held against transverse or sidewise displacement by those same tongues and grooves in combination with the line contact between the corners of the bar 51 and the beveled faces of the bar 50. It is to be understood that these pivot bars may be provided with any number of intermeshing notches and grooves, depending on the length and size of the bearing fulcrum desired.

If desired, the pointer-heads 43 may be provided at one edge with stop lugs 60 which are adapted to overly the edge of the adjoining pointer-head in the manner shown in Figure 14, to hold the several pointers in alinement when in their inoperative position.

It will be understood that the embodiment of the invention disclosed herein is illustrative of one form thereof, and that various changes and modifications in the construction and arrangement of its parts may be made within the scope of the appended claims and without departing from the spirit of the invention or sacrificing any of its advantages.

I claim as my invention:—

1. A weighing scale, comprising a base, a load-receiving platform surmounting the base, a load-balancing pendulum, a weight-indicating device actuated by said pendulum, oppositely disposed levers fulcrumed within the base below the platform and connected at their outer ends to said platform, a connection between the free end of one of said levers and the pendulum, and a cushioning element connected to the corresponding end of the companion lever.

2. A weighing scale, comprising a base, a load-receiving platform surmounting the base, a load-balancing pendulum, a weight-indicating device actuated by said pendulum, oppositely disposed levers fulcrumed intermediate their ends within the base below said platform and connected at their outer ends by load-bearing pivots to the platform, a connection between the free end of one of said levers and the pendulum, and a pneumatic cushioning element connected to the corresponding end of the companion lever.

3. A weighing scale, comprising a hollow base and a casing rising from the rear end of said base, a load-receiving platform surmounting said base, a load balancing pendulum arranged within said casing, a weight-indicting device in said casing actuated by said pendulum, oppositely-disposed levers fulcrumed intermediate their ends within said base below said platform and connected at their outer ends by load-bearing pivots to the platform, the inner end of one of said levers having a part extending rearwardly therefrom into said casing, a connection between said lever-part and the pendulum, and a cushioning element in said base and connected to the inner end of the companion lever.

4. In a weighing scale, a load-balancing pendulum, a weight-indicating dial, a pointer fulcrumed to traverse said dial, and complementary trip means on said load-balancing pendulum and said pointer for propelling the pointer across the dial in response to the load imposed upon the scale.

5. In a weighing scale, a load-balancing pendulum, a weight-indicating dial, a pointer fulcrumed below the pendulum-axis to traverse said dial and having a tappet thereon, and a trip element applied to said pendulum for engagement with said pointer-tappet to move the pointer proportionately to that of the pendulum.

6. In a weighing scale, a load-balancing pendulum having a trip element thereon, and an automatic indicating device comprising a dial having weight-graduations thereon, and a plurality of independent pointers having portions disposed in the path of said trip element and successively movable over the dial in response to the movements of the pendulum.

7. In a weighing scale, a load-balancing pendulum, and an automatic indicating device comprising a dial having weight-graduations thereon, a plurality of individually pivoted pointers movable over the dial, and means controlled by said pendulum for selectively actuating said pointers in accordance with the movement of the pendulum.

8. In a weighing scale, a load-balancing pendulum, and an automatic indicating device comprising a dial having weight-graduations thereon, a plurality of individually pivoted and axially-alined pointers movable over the dial, and means controlled by the swinging movement of said pendulum for selectively and successively actuating said pointers in accordance with the movement of the pendulum.

9. In a weighing scale, a load-balancing pendulum, and an automatic indicating device, comprising a relatively fixed dial having rows of weight graduations thereon, and a plurality of independent pointers corresponding in number to said graduations-rows for traversing the same, respectively, and means governed by said pendulum for selectively and successively actuating said pointers across their respective rows of weight graduations.

10. In a weighing scale, a load-balancing pendulum, and an automatic indicating device comprising a dial having weight-graduations thereon, a plurality of pointers movable over the dial, and a trip element applied to said pendulum for successively actuating said pointers when the pendulum is swung in one direction and for returning said pointers to their initial position when said pendulum is swung in the opposite direction.

11. In a weighing scale, a load-balancing element, and an automatic indicating device comprising a dial having weight-graduations thereon, a pointer fulcrumed at its lower end to traverse said dial, the lower end of said pointer having arms disposed at opposite sides of its pivot point, and means on said load-balancing element for engaging said pointer-arms to swing the pointer in one direction or the other.

12. In a weighing scale, a load-balancing element, and an automatic indicating device comprising a dial having weight-graduations thereon, a pointer fulcrumed at its lower end to traverse said dial, a trip member on said load-balancing element having oppositely-facing trip-faces, and means at the lower end of said pointer and in the path of movement of said trip member whereby said pointer is swung in one direction or the other by the corresponding trip-face in accordance with the forward or return movement of the load-balancing element.

13. In a weighing scale, a load-balancing pendulum, and an automatic indicating device comprising a dial having weight-graduations thereon, a knife-edge pivot, a pointer arranged to traverse said dial and having a substantially inverted V-shaped bearing notch engaging said pivot, and means on said pendulum engageable at predetermined times in its movement with the resulting legs, respectively, formed by said notch, for actuating the pointer.

14. In a weighing scale, a load-balancing element fulcrumed for swinging movement, a weight-indicating pointer fulcrumed for swinging movement and having tappets adjoining its fulcrum at opposite sides thereof, and a trip member applied to said load-balancing element and having oppositely disposed faces for engagement with said pointer-tappets, respectively, to swing the pointer in response to the movements of the load-balancing element.

15. In a weighing scale, a load-balancing pendulum, and an automatic indicating device comprising a dial having weight-graduations thereon, a knife-edge pivot a pointer arranged to traverse said dial and having a substantially inverted V-shaped bearing notch engaging said pivot, and a trip element applied to said pendulum and having oppositely facing shoulders for engaging the companion resulting legs formed by said bearing notch when the pendulum is swung in one direction or the other to correspondingly move the pointer to a forward weight-indicating position or to return it to its initial position.

16. In a weighing scale, a load-balancing pendulum, and an automatic indicating device comprising a dial having rows of weight-graduations thereon, a plurality of pointers corresponding in number to said graduation-rows arranged side by side and selectively movable across the dial, and means controlled by said pendulum for selectively and successively shifting said pointers to a weight-indicating position when the pendulum is swung in one direction and for correspondingly returning said pointers in reverse sequence to their initial position when the pendulum is swung in the opposite direction.

17. In a weighing scale, a load-balancing pendulum, and an automatic indicating device comprising a dial having rows of weight-graduations thereon, a plurality of pointers corresponding in number to said graduation-rows arranged side by side and selectively movable across the dial, each of said pointers having a substantially inverted V-shaped fulcrum bearing and arms depending therefrom, and a trip element controlled by said pendulum and having a plurality of successive pairs of oppositely-facing trip faces thereon, one of the trip faces of a pair being engageable with one of the arms of a companion pointer when the pendulum is swung in one direction to swing such pointer to a weight-indicating position and the other trip face of a pair being engageable with the other arm of such pointer when the pendulum is swung in the opposite direction to return said pointer to its initial position.

18. In a weighing scale, a load-balancing element fulcrumed for swinging movement, a swinging weight-indicating pointer governed thereby and having a downwardly-opening notch therein below its fulcrum, and a part actuated by said load-balancing element and engageable with said notch for swinging the pointer in response to the fore and aft movements of the load-balancing element.

19. In a weighing scale, a load-balancing element fulcrumed for swinging movement, a swinging weight-indicating pointer governed thereby and having a downwardly-opening notch therein below its fulcrum, and a trip member actuated by said load-balancing element and arranged to register with said notch for swinging the pointer in response to the fore and aft movements of the load-balancing element, said trip member having fore and aft facing abutments engageable with the companion edges of said pointer-notch during the fore and aft movements, respectively, of said load-balancing element.

20. In a weighing scale, a load-balancing element fulcrumed for swinging movement, a swinging weight-indicating pointer governed thereby and having a downwardly-opening notch therein below its fulcrum, and a trip member actuated by said load-balancing element and arranged to register with said notch for swinging the pointer in response to the fore and aft movements of the load-balancing element, said trip member having fore and aft facing abutments engageable with the companion edges of said pointer-notch during the fore and aft movements, respectively, of said load-balancing element, the distance between said abutments being approximately equal to the width of the notch-mouth and the edges of said notch diverging outwardly and then inwardly relatively to such mouth.

21. In a weighing scale, a load-balancing element fulcrumed for swinging movement, a plurality of swinging weight-indicating pointers arranged side by side and having downwardly-opening notches therein below their fulcrum, and a step-like shaped trip member actuated by said load-balancing element and disposed beneath said pointer-notches for engagement therewith to successively swing the pointers to their weight-indicating and return positions in response to the fore and aft movements, respectively, of said load-balancing element.

22. In a weighing scale, a plurality of weight-indicating pointers disposed side by side and fulcrumed on a common pivot, each of said pointers having spaced arms projecting below said pivot, a load-responsive element, and a trip bar carried by said load responsive element and curved in the general direction of travel of and disposed beneath said pointer-arms, said bar having oppositely-facing abutments arranged to selectively engage said arms for successively swinging the pointers to their weight-indicating and reverse positions, respectively, during the fore and aft movements of said load-responsive element.

23. In a weighing scale, a load-balancing element, and an automatic indicating device comprising a dial having weight-graduations thereon, a pointer fulcrumed at its lower end to traverse said dial, the lower end of said pointer having arms disposed at opposite sides of its pivot point, and means on said load-balancing element for engaging said pointer-arms to swing the pointer in one direction or the other, said arms over-balancing the pointer to hold it in either extreme position relative to the graduation scale.

ERIK GUSTAF HEDMAN.